United States Patent
Wong

(10) Patent No.: US 6,424,955 B1
(45) Date of Patent: Jul. 23, 2002

(54) ZERO DETECTION IN DIGITAL PROCESSING

(75) Inventor: Kar Lik Wong, Berkshire (GB)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/328,335

(22) Filed: Jun. 9, 1999

(30) Foreign Application Priority Data

Jun. 10, 1998 (GB) ............................................. 9812505

(51) Int. Cl.[7] ............................................. G06F 15/00
(52) U.S. Cl. ............................................. 705/525
(58) Field of Search ............................................. 708/525

(56) References Cited

U.S. PATENT DOCUMENTS

| | | | |
|---|---|---|---|
| 3,983,382 A | * 9/1976 | Weinberger | 708/525 |
| 4,618,956 A | 10/1986 | Horst | |
| 5,020,016 A | * 5/1991 | Nakano et al. | 708/525 |
| 5,367,477 A | 11/1994 | Hinds et al. | |
| 5,561,619 A | 10/1996 | Watanabe et al. | |
| 5,581,496 A | 12/1996 | Lai et al. | |
| 5,586,069 A | * 12/1996 | Dockser | 708/525 |
| 5,862,065 A | 1/1999 | Muthusamy | |

FOREIGN PATENT DOCUMENTS

WO    WO 96/10784    4/1996

* cited by examiner

*Primary Examiner*—Tan V. Mai
(74) *Attorney, Agent, or Firm*—Westman, Champlin & Kelly

(57) ABSTRACT

There is disclosed a digital processor having an arithmetic unit and a zero detection circuit and a method of performing zero detection in a digital processor in which a zero detection circuit is connected to the input of the arithmetic unit rather than being connected to the output thereof as is conventional. This enables testing the input to the arithmetic unit independently of the arithmetic unit itself so as to detect when the output value from the arithmetic unit is zero. The result is to take the delay of the zero detection circuit out of the critical processing path.

2 Claims, 2 Drawing Sheets

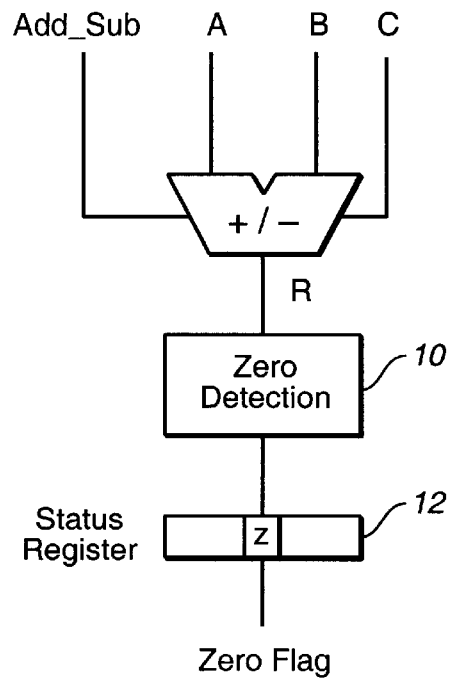
FIG._1
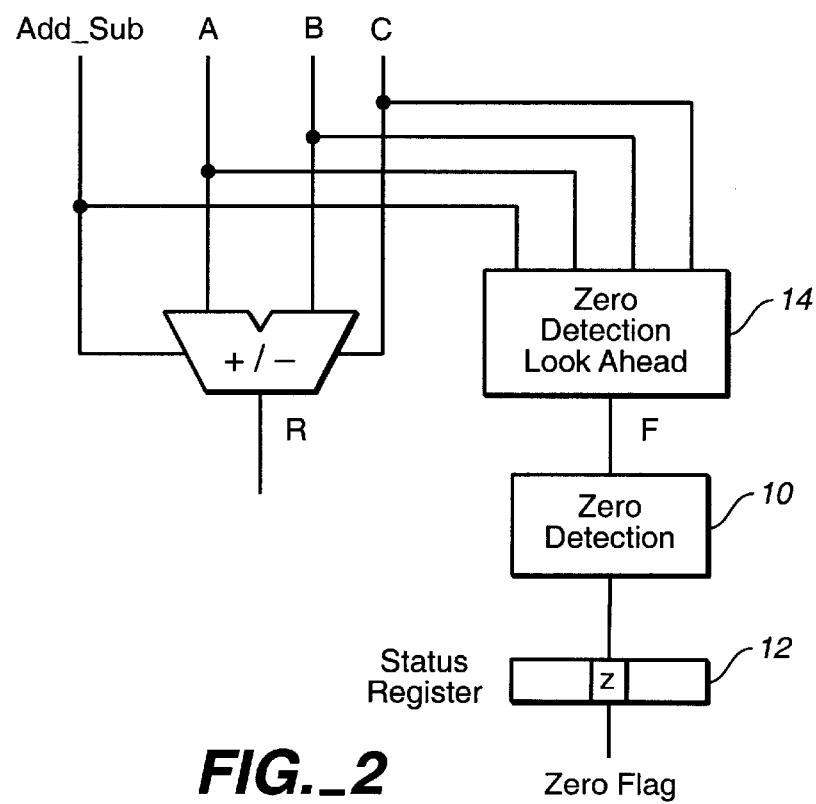
FIG._2

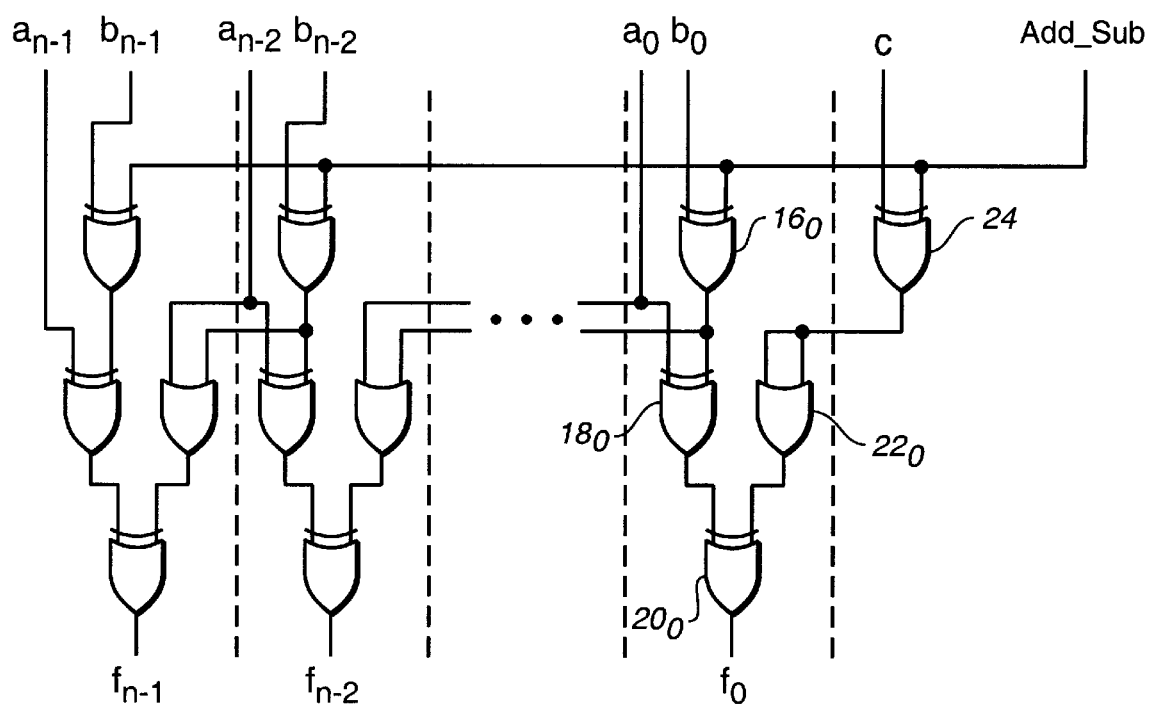
FIG._3

ZERO DETECTION IN DIGITAL PROCESSING

BACKGROUND OF THE INVENTION

The present invention relates to digital processors in general and to zero detection, for example in the output of an Arithmetic Logic Unit (ALU) in particular. Instructions in digital processors are often conditionally executed based on processor status and zero detection is an important part of status generation in such processors.

Virtually all digital processors contain zero detection logic to indicate whether the result of an arithmetic operation is zero. Programmers often use the stored zero detection result, commonly called the zero flag, and other status flags to decide how a program should behave in run-time.

The conventional manner of generating the zero flag value is to place a zero detection circuit after an adder and/or subtractor, as shown in FIG. 1. As shown in FIG. 1, the adder/subtractor (+/−) has a number of inputs (Add-Sub, A, B, c) and an output (R) which is input to the zero detection circuit 10. The zero detection circuit outputs a zero flag value (usually 1 or 0) to the zero flag position in a status register 12.

A disadvantage of the conventional arrangement is that the zero detection circuit is added to the output path of the adder/subtractor which path is often a critical path in the processor logic. As such the zero detection circuit adds a delay in the critical processing path and this degrades the processor performance. Attempts have been made to mitigate this problem by introducing an additional and so-called processor pipeline stage. This, however, has the drawback of adding significantly to the complexity of the processor and of incurring additional cost.

SUMMARY OF THE INVENTION

According to a first aspect of the present invention there is provided a digital processor having an arithmetic unit and a zero detection circuit wherein the zero detection circuit sets a zero flag when the output value from the arithmetic unit is zero, characterised in that the zero detection circuit is connected to the input of the arithmetic unit so as to enable testing of the input to the arithmetic unit independently of the arithmetic unit itself thereby to detect when the output value from the arithmetic unit is zero.

According to a second aspect of the present invention there is provided a method of performing zero detection in a digital processor so as to set a zero flag when the output value from an arithmetic unit of the processor is zero, comprising the step of connecting a zero detection circuit to the input of the arithmetic unit and testing the input to the arithmetic unit independently of the arithmetic unit itself so as to detect when the output value from the arithmetic unit is zero.

BRIEF DESCRIPTION OF THE DRAWINGS

Embodiments of the present invention will now be described by way of example only and with reference to the accompanying drawings in which:

FIG. 1 is a schematic block diagram illustrating the conventional approach to zero flag generation, FIG. 2 is a schematic block diagram illustrating an embodiment of the present invention, and FIG. 3 is a schematic block diagram illustrating an implementation of the zero detection look ahead circuit included in the embodiment shown in FIG. 2.

DETAILED DESCRIPTION OF ILLUSTRATIVE EMBODIMENTS

In FIG. 2 the same reference signs are used to denote features which generally correspond to those indicated by the same signs in FIG. 1. As illustrated in FIG. 2, the zero detection circuit 12 is not connected to the output R of the adder/subtractor (+/−) but is, to the contrary, connected to the inputs (Add_Sub, A, B, c) thereof. The connection is not direct but is via a zero detection look ahead circuit 14. A generalised zero detection look ahead circuit in accordance with the present invention is illustrated in FIG. 3. The circuit of FIG. 3 consists of a plurality of interconnected EOR (exclusive-or) and OR logic circuits (gates).

The output F of the zero detection look ahead circuit 14, which is input to the zero detection circuit 10, is constituted by the sum of a plurality of (n) of output components $f_0$ to $f_{n-1}$. Each of these components $f_0$ to $f_{n-1}$ can be considered to be output by a respective circuit segment, these circuit segments being indicated by the vertical chain lines in FIG. 3. Each segment comprises three EXOR gates, for example $16_0$, $18_0$, $20_0$ in the of segment, and an OR gate, for example $22_0$ in the $f_0$ segment. In each segment, EXOR gate 16 receives one input (eg. $b_0$) from the B input to the adder/subtractor (+/−) and one input from the Add_Sub input to the adder/subtractor (+/−). The output from EXOR 16 is applied to one input of EXOR 18. The other input of EXOR 18 receives an input (eg. $a_0$) from the A input to the adder/subtractor (+/−). The output from EXOR 18 is applied to one input of EXOR 20. The other input to EXOR 20 is supplied by OR gate 22. One input of OR gate 22 is taken from the a input from the previous segment. For example, the respective input in the n−1 segment is taken from the $a_{n-2}$ input applied to EXOR $18_{n-2}$ of the n−2 segment. The other input to OR gate 22 is supplied from the output of the EXOR gate 16 of the previous segment. For example, the respective input in the n−1 segment is taken from the output of EXOR $16_{n-2}$ of the n−2 segment. EXOR 20 produces the output (e.g. $f_0$) of the segment. In the special case of segment $f_0$, both inputs of the OR gate 22 are supplied by the output of an EXOR gate 24. EXOR 24 has one input, c, from the C input to the adder/subtractor (+/−) and one input from the Add_Sub input to the adder/subtractor (+/−).

The arrangement illustrated in FIGS. 2 and 3 enables a fast zero detection to be performed, concurrently and independently of the adder/subtractor. The delay incurred by the zero detection circuit is not added to the ALU critical path.

The zero detection output in the arrangement of FIGS. 2 and 3 is guaranteed to be the same as in the conventional arrangement. By avoiding carry propagation, the arrangement according to the present invention is, however, much faster than the adder/subtractor. The zero detection look ahead circuit is much faster than an adder as the look ahead circuit does not suffer from the long carry propagation delay inherent in the adder. Simulation has shown the combined delay of the zero detection look ahead circuit and the zero detection circuit itself to be shorter than the delay of a highly optimised adder/subtractor in a 36-bit datapath.

As the ALU is often on the critical path of a well balanced high performance processor, the present invention improves overall performance of the processor by taking the zero detection delay out of the ALU path. Moreover, the arrangement shown in FIG. 3 has the advantage of being highly scalable. That is, the uses to which processors are put are demanding wider datapaths in high performance processors. A wider ALU suffers more from carry propagation as the delay path becomes longer. However, the zero detection look ahead circuit of FIG. 3 can readily be adapted to wider datapaths. This is because each segment depends only on four local inputs and one global input. As a result, the improvement in zero detection speed with the present invention increases with the datapath width.

A specific embodiment has been described and illustrated. However, it is to be noted that other circuits can be adopted to implement the basic principle of connecting a zero detection circuit to the input of an arithmetic unit and testing the input to the arithmetic unit independently of the arithmetic unit itself so as to detect when the output value from the arithmetic unit is zero.

What is claimed is:

1. A digital processor comprising an arithmetic unit and a zero detection circuit, wherein the arithmetic unit has first and second multiple-bit inputs, a carry input, and add-subtract control and an output and the zero detection circuit is connected to the inputs of the arithmetic unit and is adapted to set a zero flag when the output of the arithmetic unit is zero, based on the inputs of the arithmetic unit and independently of the arithmetic unit itself, wherein the zero detection circuit comprises:

a first exclusive-OR gate having a first input coupled to the carry input, a second input coupled to the add-subtract control input, and an output; and a plurality of segments including a least significant segment, wherein there is one segment for each respective bit of the first and second data inputs, and wherein each segment comprises:

a second exclusive-OR gate having a first input coupled to the respective bit in the first data input, a second input, and an output;

a third exclusive-OR gate having a first input coupled to the respective bit in the second data input, a second input coupled to the add-subtract control input, and an output coupled to the second input of the second exclusive-OR gate;

an OR gate having a first input coupled to a next preceding bit relative to the respective bit in the first data input, a second input coupled to the output of the third exclusive-OR gate in the next preceding segment, and an output, except that the first and second inputs of the OR gate in the least significant segment are coupled to the output of the first exclusive-OR gate; and a fourth exclusive-OR gate having a first input coupled to the output of the second exclusive-OR gate, a second input coupled to the output of the OR gate, and an output.

2. A method of performing zero detection in a digital processor so as to set a zero flag when an output value from an arithmetic unit of the processor is zero, wherein the arithmetic unit comprises first and second multiple-bit data inputs, a carry input, and add-subtract control and an output and the method comprises:

performing a first exclusive-OR operation on the carry input and add-subtract control input to produce a first exclusive-OR result;

providing a plurality of zero detection look ahead segments including a least significant segment, wherein there is one segment for each respective bit of the first and second data inputs; and performing the following steps with each segment:

performing a second exclusive-OR operation on the respective bit in the second data input and the add-subtract control input;

performing a third exclusive-OR operation on the respective bit in the first data input and a result of the second exclusive-OR operation;

performing an OR operation on a next preceding bit relative to the respective bit in the first data input and on the result of the second exclusive-OR operation in the next preceding segment, except that in the least significant segment the OR operation is performed on a result of the first exclusive-OR operation; and performing a fourth exclusive-OR operation on a result of the third exclusive-OR operation and a result of the OR operation.

* * * * *